(12) United States Patent
Hasan et al.

(10) Patent No.: US 10,495,210 B2
(45) Date of Patent: Dec. 3, 2019

(54) INTEGRAL RING GEAR AND TORQUE ARM FOR A WIND TURBINE GEARBOX

(71) Applicant: General Electric Company, Schenectady, NY (US)

(72) Inventors: Raed Zuhair Hasan, Greenville, SC (US); Kevin M. Vandevoorde, West Chester, OH (US); Lawrence Keith Taliaferro, Jr., Greenville, SC (US); George Albert Goller, Bluffton, SC (US); James Edward Cencula, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/807,823

(22) Filed: Nov. 9, 2017

(65) Prior Publication Data

US 2019/0136962 A1    May 9, 2019

(51) Int. Cl.
*F16H 57/08*    (2006.01)
*F16H 1/28*    (2006.01)
(Continued)

(52) U.S. Cl.
CPC ........... *F16H 57/08* (2013.01); *B23K 26/342* (2015.10); *B33Y 80/00* (2014.12); *F03D 15/00* (2016.05);
(Continued)

(58) Field of Classification Search
CPC . F16H 1/28; F16H 55/06; F16H 55/17; F16H 57/032; F16H 57/08; F16H 2055/176; B33Y 80/00; B33Y 10/00; B23K 26/342; B23K 2101/008; F03D 15/00; B22D 25/02; B28B 1/001; F05B 2230/311; F05B 2260/40311; F05B 2280/101; F05B 2280/1071; F05B 2280/20041;
(Continued)

(56) References Cited

U.S. PATENT DOCUMENTS 5,288,556 A * 2/1994 Lemelson ................. B01J 8/42
                                                  428/216
6,170,156 B1 * 1/2001 Lev ......................... B21D 53/28
                                                   29/404
(Continued)

FOREIGN PATENT DOCUMENTS

CA          2679726 A1     11/2009
DE    20 2011 107611 U1    11/2012
(Continued)

OTHER PUBLICATIONS

EP Search Report, dated Mar. 25, 2019.

*Primary Examiner* — Leslie A Nicholson, III
(74) *Attorney, Agent, or Firm* — Dority & Manning, P.A.

(57) ABSTRACT

An integral ring gear and torque arm for a wind turbine gearbox and method of manufacturing same includes forming the ring gear and the associated gear housing as a single part using the same material, e.g., using a casting process. Further, the ring gear defines an inner circumferential surface having a plurality of gear teeth. Thus, the method also includes applying a coating material to the gear teeth of the ring gear via an additive manufacturing process, such as cold spraying, so as to increase a hardness of gear teeth.

9 Claims, 13 Drawing Sheets

(51) Int. Cl.

| | |
|---|---|
| *F16H 55/06* | (2006.01) |
| *F16H 55/17* | (2006.01) |
| *F16H 57/032* | (2012.01) |
| *B23K 26/342* | (2014.01) |
| *B33Y 80/00* | (2015.01) |
| *F03D 15/00* | (2016.01) |
| *B28B 1/00* | (2006.01) |
| *B33Y 10/00* | (2015.01) |
| *B22D 25/02* | (2006.01) |
| *B23K 101/00* | (2006.01) |

(52) U.S. Cl.
CPC ............... *F16H 1/28* (2013.01); *F16H 55/06* (2013.01); *F16H 55/17* (2013.01); *F16H 57/032* (2013.01); *B22D 25/02* (2013.01); *B23K 2101/008* (2018.08); *B28B 1/001* (2013.01); *B33Y 10/00* (2014.12); *F05B 2230/30* (2013.01); *F05B 2230/311* (2013.01); *F05B 2230/41* (2013.01); *F05B 2230/90* (2013.01); *F05B 2260/40311* (2013.01); *F05B 2280/101* (2013.01); *F05B 2280/1071* (2013.01); *F05B 2280/20041* (2013.01); *F05B 2280/20071* (2013.01); *F05B 2280/20073* (2013.01); *F05B 2280/20082* (2013.01); *F05B 2280/5007* (2013.01); *F16H 2055/176* (2013.01)

(58) Field of Classification Search
CPC .. F05B 2280/20071; F05B 2280/20073; F05B 2280/20082
USPC ......................................................... 475/344
See application file for complete search history.

(56) References Cited

U.S. PATENT DOCUMENTS

| | | | |
|---|---|---|---|
| 6,790,156 B2* | 9/2004 | Hosle | F16H 1/227 475/331 |
| 6,883,235 B2 | 4/2005 | Bell | |
| 6,997,077 B2* | 2/2006 | Kollmann | F16H 55/06 29/893.1 |
| 8,100,027 B2* | 1/2012 | Sato | B24B 31/003 74/434 |
| 8,235,861 B2 | 8/2012 | Lopez et al. | |
| 8,376,902 B2 | 2/2013 | Fox et al. | |
| 8,430,788 B2* | 4/2013 | Fox | F16C 35/063 475/347 |
| 8,672,797 B2 | 3/2014 | Fox | |
| 8,690,539 B2 | 4/2014 | Hohle et al. | |
| 8,702,558 B2 | 4/2014 | Smook | |
| 8,758,190 B2 | 6/2014 | Montestrue | |
| 8,920,284 B2 | 12/2014 | Fox | |
| 8,961,362 B2 | 2/2015 | Fox et al. | |
| 9,103,413 B2 | 8/2015 | Curti et al. | |
| 2009/0220343 A1* | 9/2009 | Dimascio | F16H 55/12 416/161 |
| 2011/0068583 A1 | 3/2011 | Burkart | |
| 2011/0171026 A1 | 7/2011 | Kolpin et al. | |
| 2012/0184404 A1 | 7/2012 | Chobot et al. | |

FOREIGN PATENT DOCUMENTS

| | | |
|---|---|---|
| EP | 1 046 838 A2 | 10/2000 |
| EP | 1 184 567 A2 | 3/2002 |
| EP | 2 677 206 A1 | 12/2013 |
| FR | 2 804 726 A1 | 8/2001 |
| IN | 201000506 I2 | 9/2016 |
| JP | 2008196702 A | 8/2008 |
| WO | WO2009/102853 A1 | 8/2009 |
| WO | WO2009/134684 A1 | 11/2009 |

* cited by examiner

INTEGRAL RING GEAR AND TORQUE ARM FOR A WIND TURBINE GEARBOX

FIELD

The present disclosure relates in general to wind turbines, and more particularly to an integral ring gear and torque arm for a wind turbine gearbox formed, at least in part, via additive manufacturing.

BACKGROUND

Generally, a wind turbine includes a tower, a nacelle mounted on the tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high speed, low torque output that may drive the electric generator.

The gearbox generally includes a gearbox housing containing a plurality of gears (e.g., planetary, ring and/or sun gears) connected via one or more planetary carriers and bearings for converting the low speed, high torque input of the rotor shaft to a high speed, low torque output for the generator. In addition, each of the gears rotates about a pin shaft arranged within the one or more planetary carriers. The gearbox is then attached to the bedplate via a torque arm. More specifically, for conventional wind turbines, the ring gear of the gearbox is a separate component from the torque arm and is thus fastened to the torque arm via one or more fasteners and/or flanges.

Thus, the ring gear and the torque arm are separately manufactured from different materials to accommodate varying stresses and/or loading. More specifically, the ring gear is generally formed via forging, whereas the torque arm is generally formed via casting. As such, the manufacturing process for the ring gear and the torque arm requires at least two completely separate manufacturing processes with the resulting parts being joined together via connecting fasteners and flanges. The ring gear must also be subsequently heat treated to obtain a certain hardness. Thus, the aforementioned manufacturing techniques are complex and expensive. In addition, the heat treatment may cause dimensional distortion.

Accordingly, an improved gearbox assembly for a wind turbine and method of manufacturing same that addresses the aforementioned issues would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a method for manufacturing a ring gear and associated housing of a gearbox of a wind turbine. The method includes forming the ring gear and the associated gear housing as a single part using the same material. Further, the ring gear defines an inner circumferential surface having a plurality of gear teeth. The method also includes applying a coating material to the plurality of gear teeth of the ring gear via an additive manufacturing process so as to increase a hardness of the plurality of gear teeth.

In one embodiment, the additive manufacturing process may include cold spraying, thermal spray, laser cladding, binder jetting, material jetting, directed energy deposition, powder bed fusion, or any other suitable additive technique.

In another embodiment, the coating material may include boron nitride, aluminum oxide, silicon carbide, tungsten carbide, or any other material for providing a desired hardness to the gear teeth.

In further embodiments, the step of forming the ring gear and the associated gear housing as the single part may include casting the ring gear and the gear housing as the single part. In such embodiments, the step of casting the ring gear and the gear housing as the single part may include pouring a liquid material into a mold of the ring gear and the gear housing and allowing the liquid material to solidify in the mold so as to form the ring gear and the gear housing as the single part.

In additional embodiments, the method may include forming the ring gear and the gear housing from steel, cast steel, iron, ductile iron, or any other suitable material.

In several embodiments, the associated gear housing may include any suitable housing or casing, such as first and/or second stage gear housings as well as a torque support of the gearbox.

In certain embodiments, the method may also include machining the plurality of gear teeth after applying the coating material. For example, in such embodiments, the step of machining the plurality of gear teeth may include hobbing or grinding the plurality of gear teeth after applying the coating material.

In another aspect, the present disclosure is directed to a gearbox assembly. The gearbox assembly includes a planetary gear system having a plurality of planet gears, at least one sun gear, at least one ring gear, at least one planetary carrier operatively coupled with the plurality of planet gears, and a plurality of pin shafts. Further, the ring gear defines an inner circumferential surface comprising a plurality of gear teeth. The gearbox assembly also includes a torque support formed integrally with the ring gear and a coating material applied to the plurality of gear teeth of the ring gear so as to increase a hardness of the plurality of gear teeth. It should also be understood that the gearbox assembly may further include any of the additional features described herein.

In yet another aspect, the present disclosure is directed to a method for manufacturing a ring gear and a gear housing of a gearbox of a wind turbine. The method includes pouring a liquid steel material into a mold of the ring gear and the gear housing. The method also includes allowing the liquid steel material to solidify in the mold so as to form an integral ring gear and gear housing constructed of a common material. Further, the ring gear defines an inner circumferential surface having a plurality of gear teeth.

In one embodiment, the method may also include placing a core material (such as steel or ductile iron) into the mold before pouring the liquid steel material into the mold and allowing the liquid steel material to solidify in the mold around the core material.

In another embodiment, the method may further include applying a coating material to the plurality of gear teeth of the ring gear via an additive manufacturing process so as to increase a hardness of the plurality of gear teeth. It should also be understood that the method may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
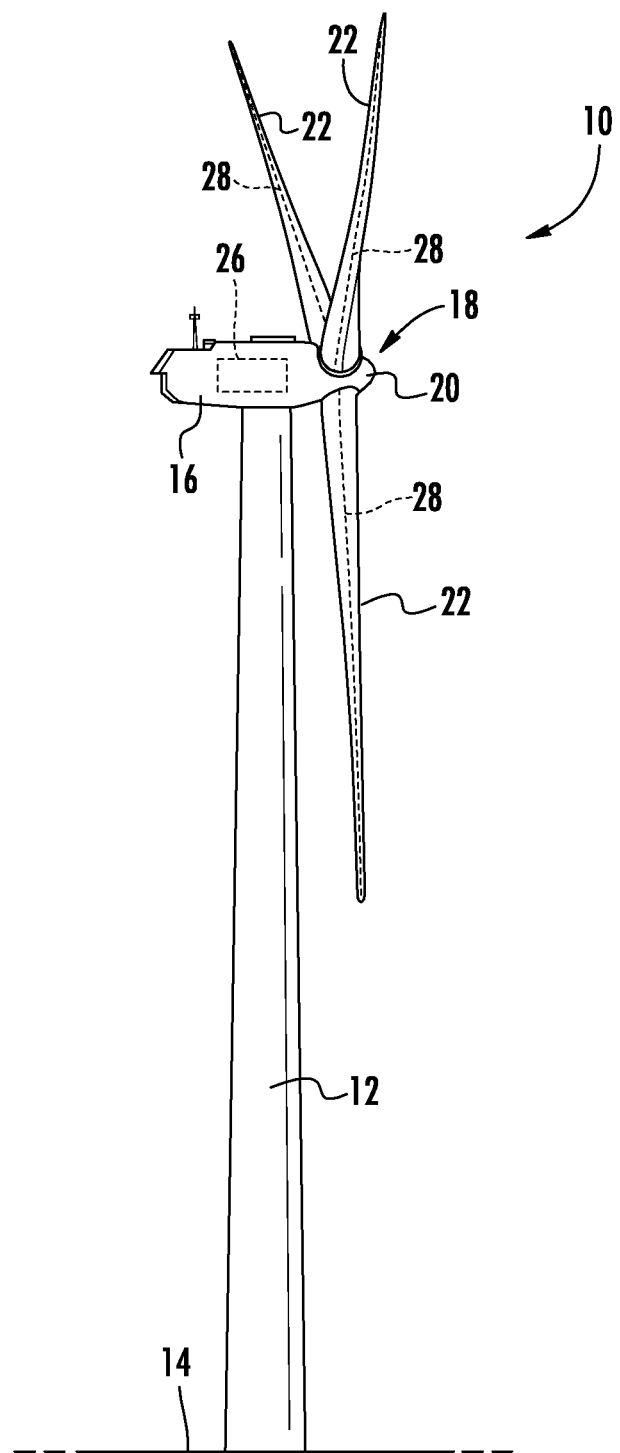
FIG. 1 illustrates a perspective view of one embodiment of a wind turbine according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a method for manufacturing an integral ring gear and associated housing, such as a torque arm, of a gearbox of a wind turbine. As such, the method can be applied to any wind turbine gearbox, including but not limited to the main drivetrain assembly gearbox as well as pitch and yaw drive gearboxes. The method includes forming the ring gear and the associated gear housing as a single part using the same material. Further, the ring gear defines an inner circumferential surface having a plurality of gear teeth. Thus, the method also includes applying a coating material to the gear teeth of the ring gear via an additive manufacturing process, such as cold spraying, thermal spraying, or laser cladding, so as to increase a hardness of gear teeth.

Thus, the present disclosure provides many advantages not present in the prior art. For example, the integral ring gear/torque arm eliminates the connecting fasteners and flanges between parts, thereby reducing machining cost, bolting of the interfaces, and handling of the extra parts, as well as the failure modes of the interfaces. In addition, the need for heat treatment is eliminated, thereby decreasing dimensional distortion of the associated part.

Referring now to the drawings, FIG. 1 illustrates a perspective view of one embodiment of a wind turbine 10 according to conventional construction. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotation of the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
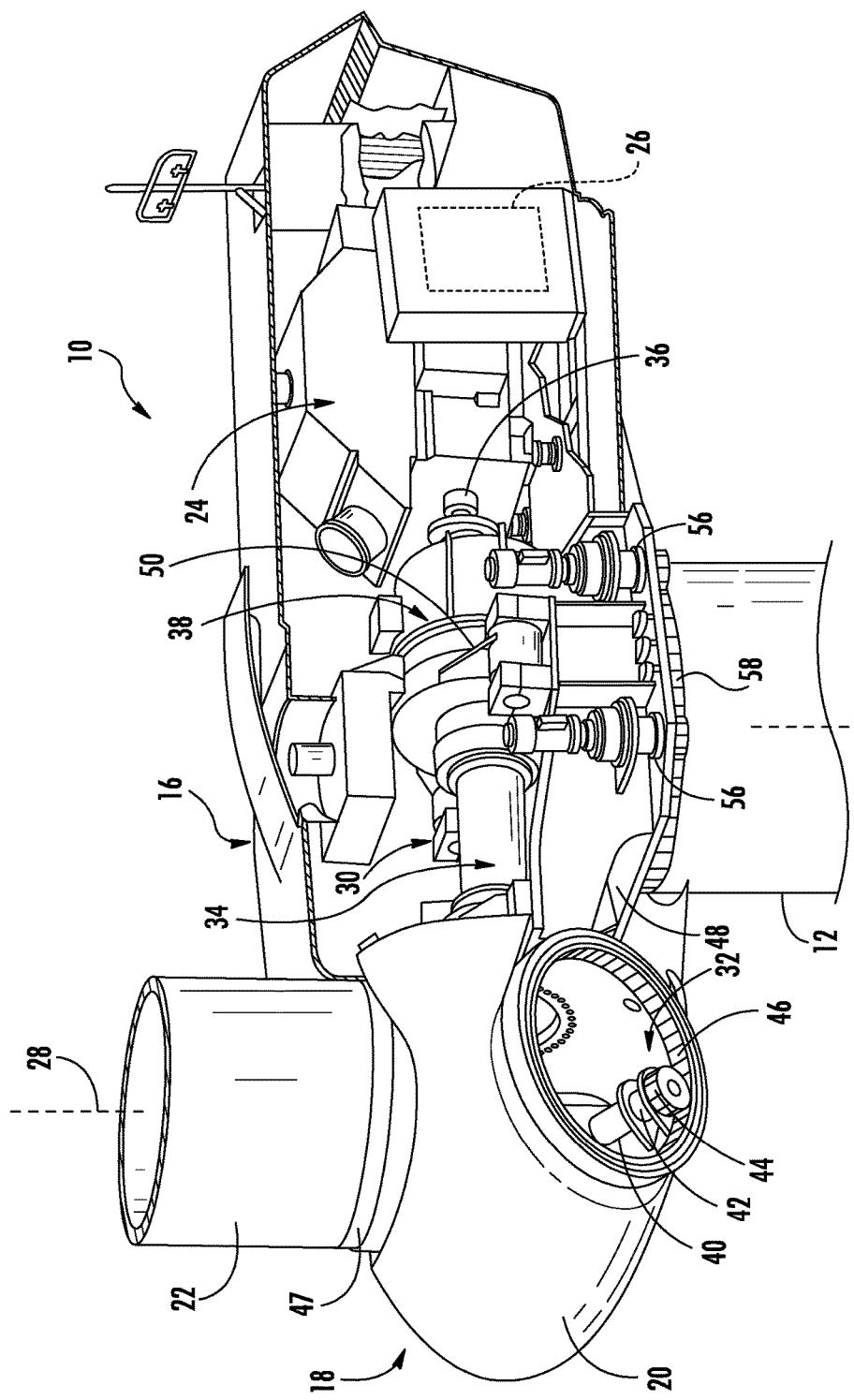
FIG. 2 illustrates a detailed, internal view of one embodiment of a nacelle of a wind turbine according to conventional construction.

Referring now to FIG. 2, a simplified, internal view of one embodiment of the nacelle 16 of the wind turbine 10 shown in FIG. 1 is illustrated. As shown, a drivetrain assembly 30 of the wind turbine 10 is housed within the nacelle 16. More specifically, as shown, the drivetrain assembly 30 includes the generator 24, which is coupled to the rotor 18 for producing electrical power from the rotational energy generated by the rotor 18. For example, as shown, the rotor 18 may include a rotor shaft 34 coupled to the hub 20 for rotation therewith. The rotor shaft 34 may, in turn, be rotatably coupled to a generator shaft 36 of the generator 24 through a gearbox 38 connected to a bedplate support frame 48 by a torque support 50. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 56 communicatively coupled to the controller 26, with each yaw drive mechanism(s) 56 being configured to change the angle of the nacelle 16 relative to the wind (e.g., by engaging a yaw bearing 58 of the wind turbine 10).

Figure 3:
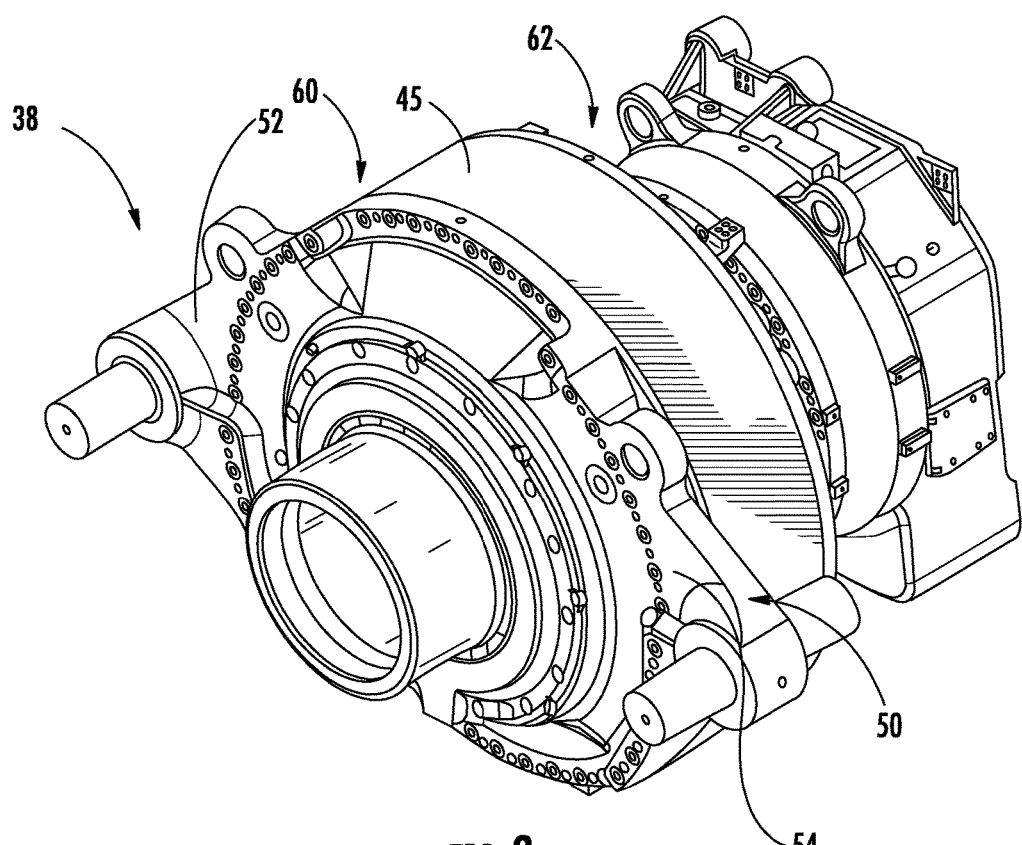
FIG. 3 illustrates a perspective view of one embodiment of a gearbox assembly of a wind turbine according to conventional construction.
Figure 4:
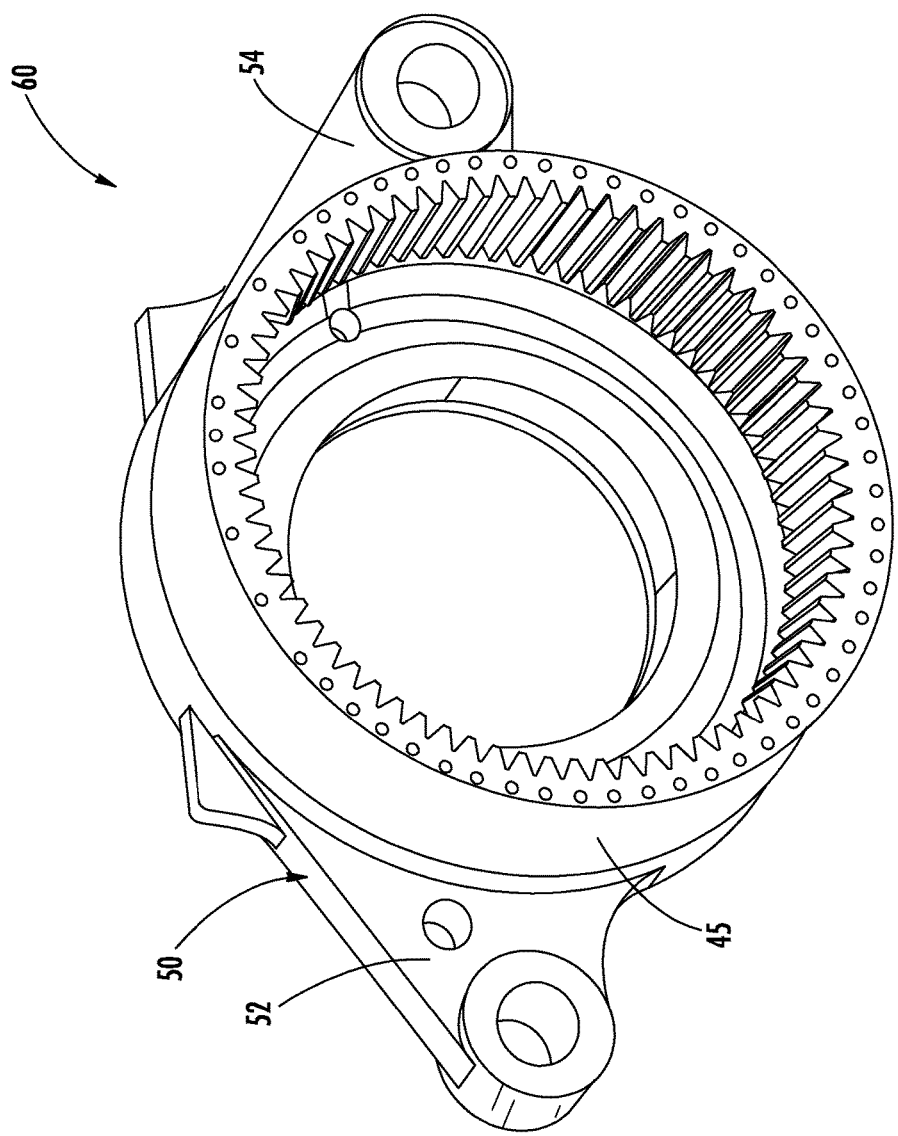
FIG. 4 illustrates a perspective view of one embodiment of a first stage ring gear and a separate torque arm of a gearbox of a wind turbine according to conventional construction.

Referring now to FIGS. 3-6, various views of the gearbox 38 according to conventional construction are illustrated. As mentioned, the gearbox 38 may be secured to the bedplate support frame 48 via the torque support 50. In addition, as shown, the gearbox 38 includes a first stage gear assembly 60 and a second stage gear assembly 62. Thus, as shown in FIGS. 3 and 4, the first stage gear assembly 60 includes the torque support 50 and a main ring gear 45. More specifically, as shown, the torque support 50 may include a first torque arm 52 and a second torque arm 54 configured on opposing sides of the gearbox 38.

Figure 5:
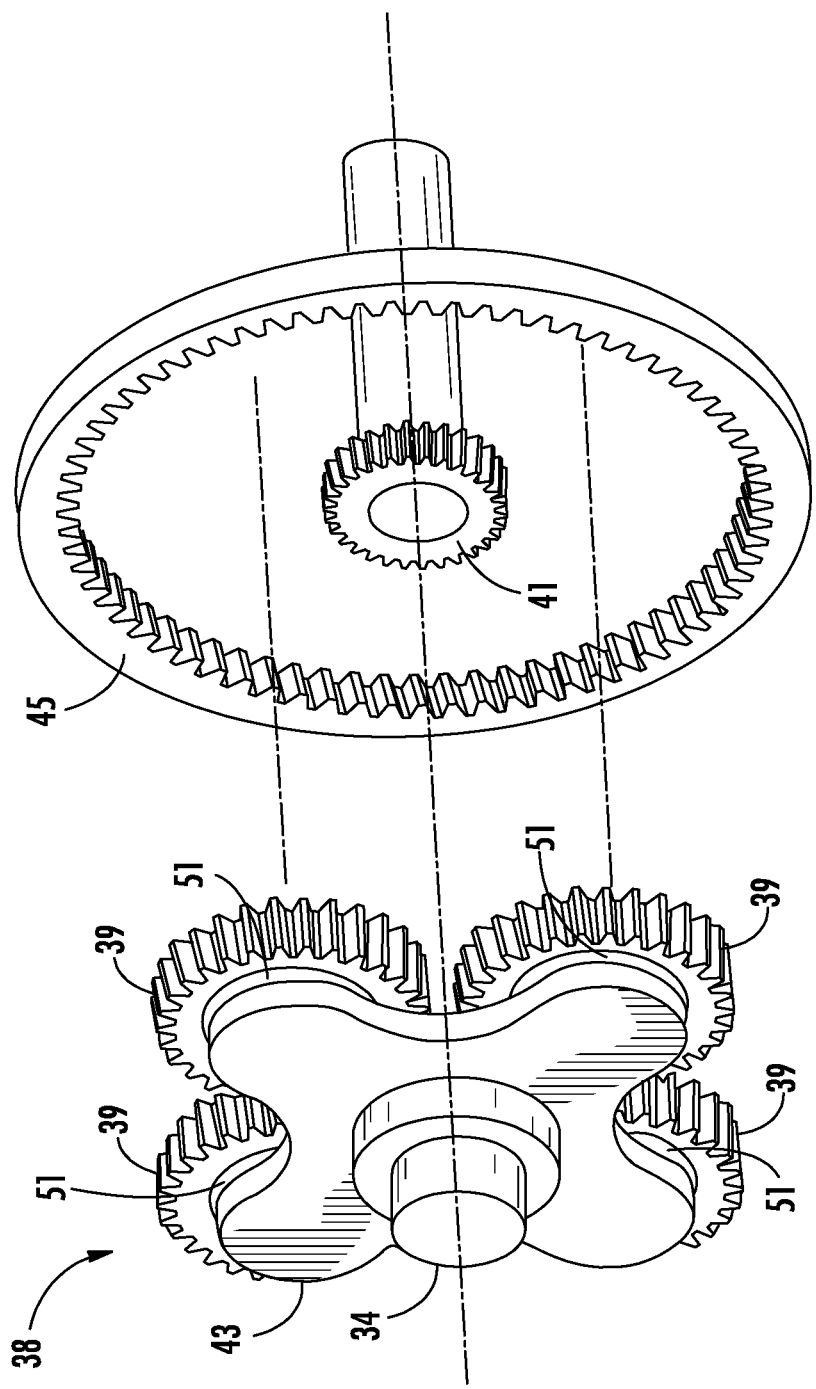
FIG. 5 illustrates an exploded view of one embodiment of a planetary gear system according to conventional construction.

Referring particularly to FIG. 5, the gearbox 38 may include any suitable gear assembly that uses one or more gears and/or gear trains to provide speed and/or torque conversions from the rotor shaft 34 to the generator 24. For example, as shown, the gearbox 38 may include a planetary gear system having one or more outer or planet gears 39 revolving about a central or sun gear 41. In addition, the planet gears 39 are typically mounted on a movable arm or carrier 43 which itself may rotate relative to the sun gear 41. Moreover, as shown, each individual planet gear 39 may be mounted around a pin shaft 51 so as to individually rotate around its respective pin shaft 51. The gearbox 38 may also include at least one outer ring gear 45 configured to mesh with the planet gears 39. Thus, a typical ring gear 45, such as that shown in FIG. 5, generally includes a set of gear teeth on an inner circumferential surface thereof that are configured to mesh with corresponding teeth of the planet gears 39.

Figure 6:
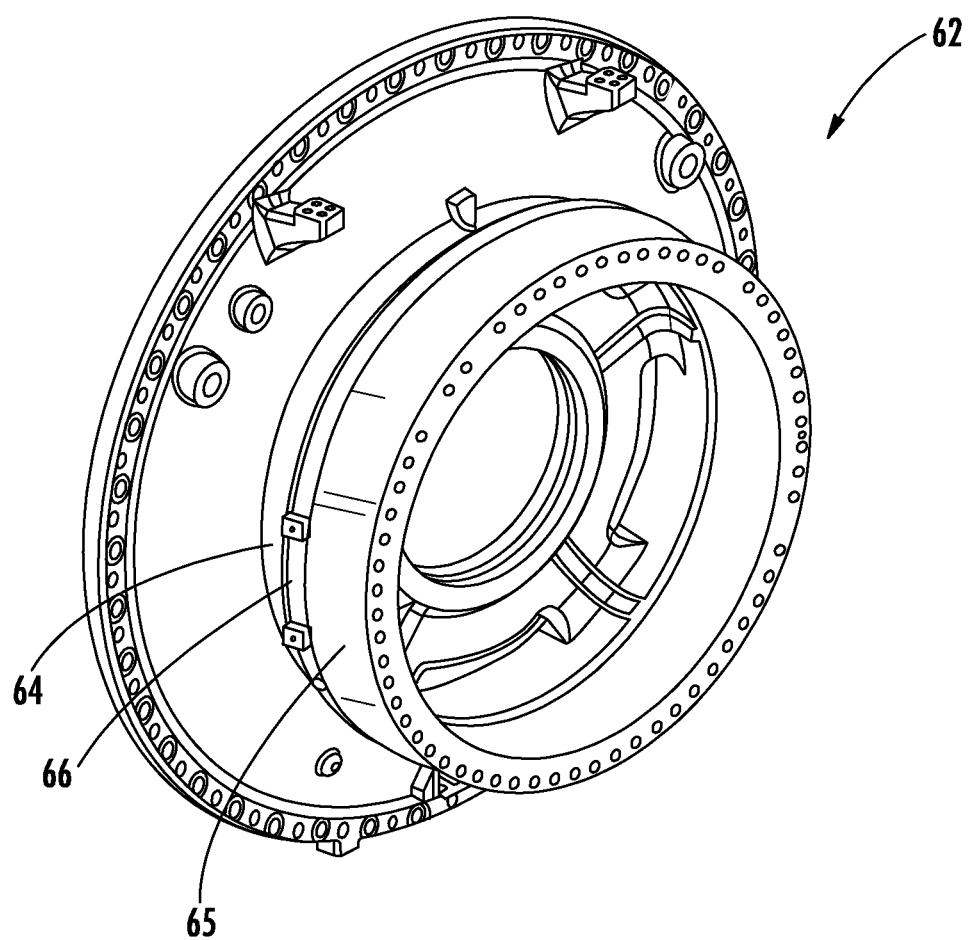
FIG. 6 illustrates a perspective view of one embodiment of a second stage ring gear and associated housing of a gearbox of a wind turbine according to conventional construction.

Accordingly, for conventional systems, the ring gear 45 and the torque support 50 are separate components that are mounted together atop the bedplate support frame 48. In addition, as shown in FIG. 6, as mentioned, the gearbox 38 may also include a second stage gear assembly 62. Similar to the first stage gear assembly 60, the second stage gear assembly 62 may also include a secondary ring gear 65 and a separate casing or housing 64 connected to the ring gear 65 by a flange 66.

Referring now to FIGS. 7-10, various views of first and second stage ring gear/housing assemblies 160, 162 according to the present disclosure are illustrated. Such gear assemblies 160, 162 may generally include any suitable planetary gear system such as the planetary gear system illustrated in FIG. 5. As such, the first and/or second stage gear assemblies 160, 162 may include a plurality of planet gears, at least one sun gear, at least one ring gear 145, 165, at least one planetary carrier operatively coupled with the plurality of planet gears, and a plurality of pin shafts. More specifically, as shown particularly in FIGS. 7 and 9, the first stage gear assembly 160 includes, at least, a primary ring gear and 145 and a torque support 150 (e.g. that includes first and second torque arms 152, 154). Similarly, the second stage gear assembly 162 includes, at least, a secondary ring gear 165 and an associated second stage gear housing 164. The additional components (e.g. gears, shafts, etc.) are not included in the figures to illustrate the details of the present disclosure.

Figure 7:
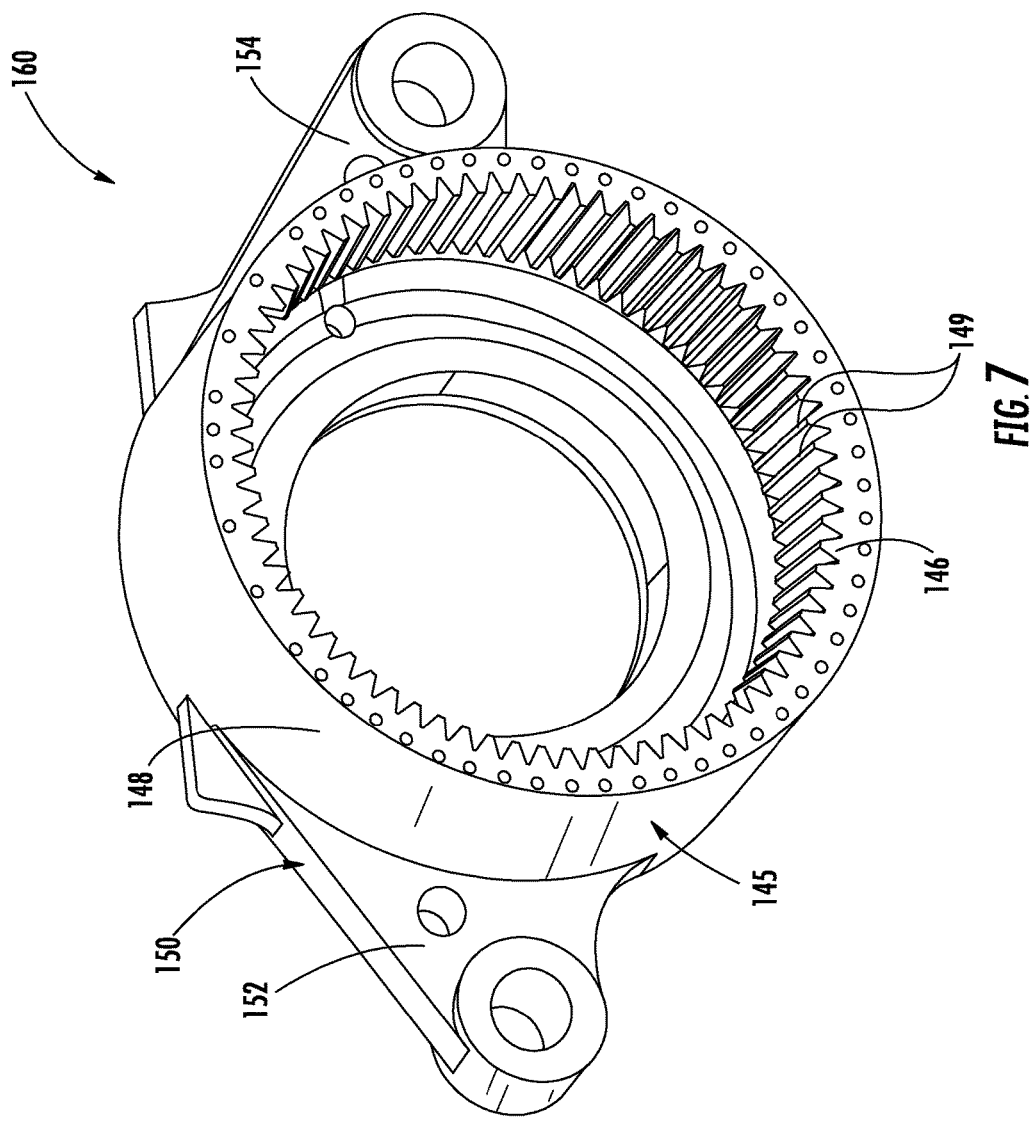
FIG. 7 illustrates a perspective view of one embodiment of a first stage ring gear and integral torque arm of a gearbox of a wind turbine according to the present disclosure.
Figure 8:
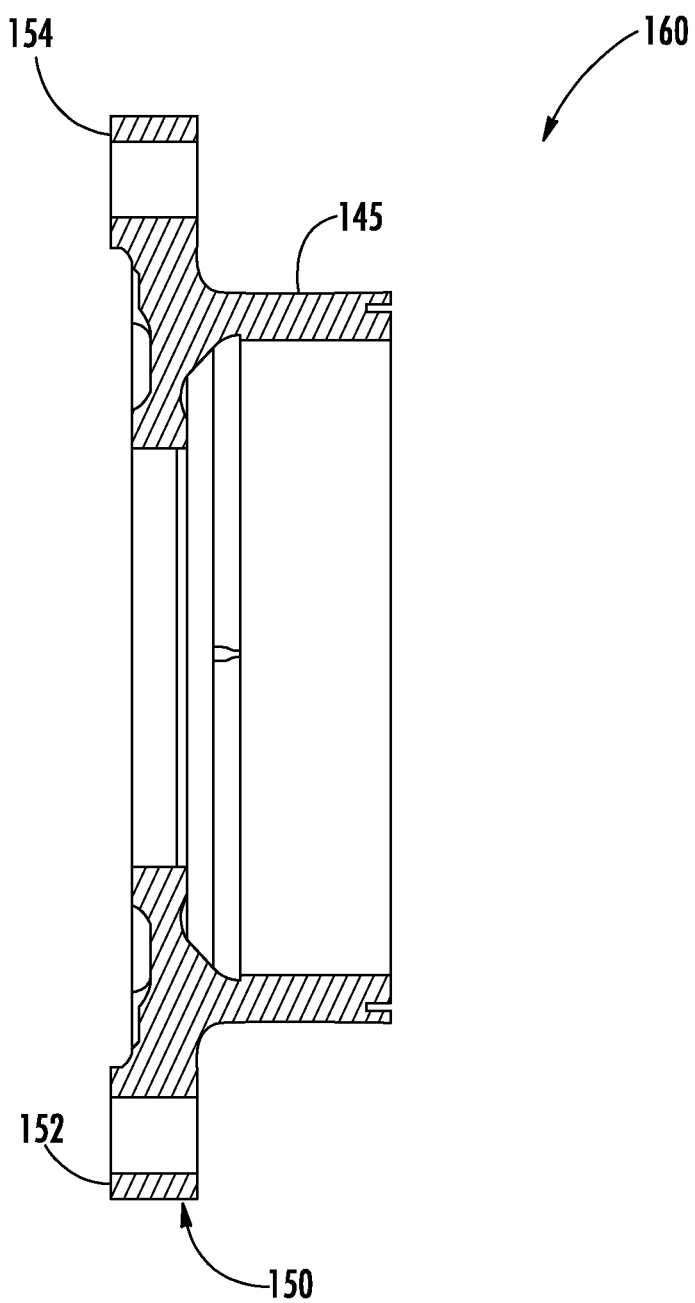
FIG. 8 illustrates a cross-sectional view of one embodiment of a first stage ring gear and integral torque arm of a gearbox of a wind turbine according to the present disclosure.
Figure 9:
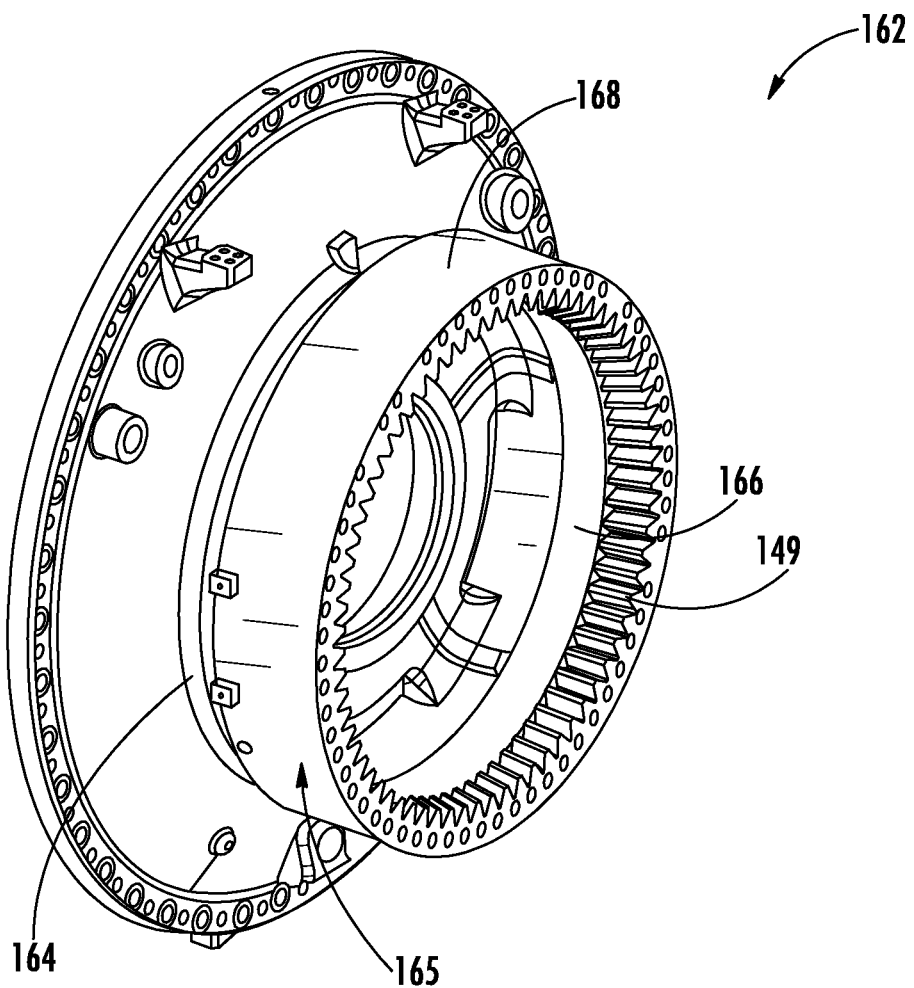
FIG. 9 illustrates a perspective view of one embodiment of an integral second stage ring gear and associated housing of a gearbox of a wind turbine according to the present disclosure.
Figure 10:
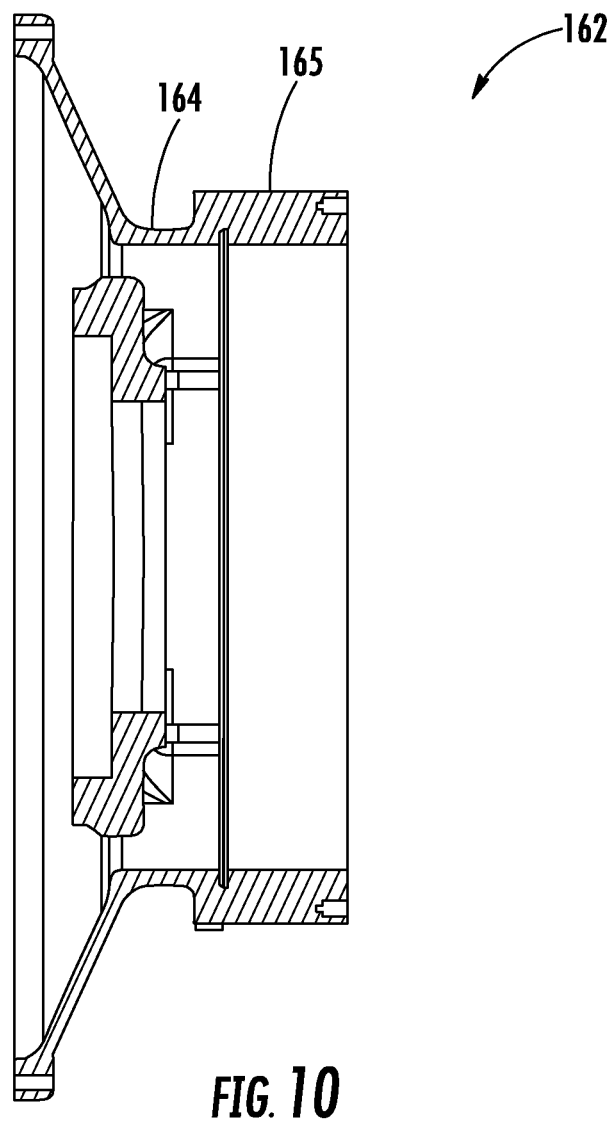
FIG. 10 illustrates a cross-sectional view of one embodiment of an integral second stage ring gear and associated housing of a gearbox of a wind turbine according to the present disclosure.

More specifically, as shown particularly in FIG. 7, the ring gear(s) 145, 165 includes opposing inner and outer circumferential surfaces 146, 148 (and 166, 168) and a plurality of gear teeth 149, 169 on the inner circumferential surfaces 146, 166 so as to mesh with the planet gears of the gearbox (not shown).

In contrast to the first and second stage gear assemblies 60, 62 of conventional gearboxes illustrated in FIGS. 3-6, however, the first and second stage gear assemblies 160, 162 of the present disclosure combine the ring gear(s) 145, 165 and the associated torque support/gear housing(s) 150, 164 into a single structure. Thus, as generally shown in FIGS. 7-10, the connecting fasteners and/or flanges between the ring gear(s) 145, 165 and the associated gear housing(s) 150, 164 can be integrated. It should be understood that the gearbox may also be a single stage planetary gear assembly or may have more than two planetary stages.

Figure 11:
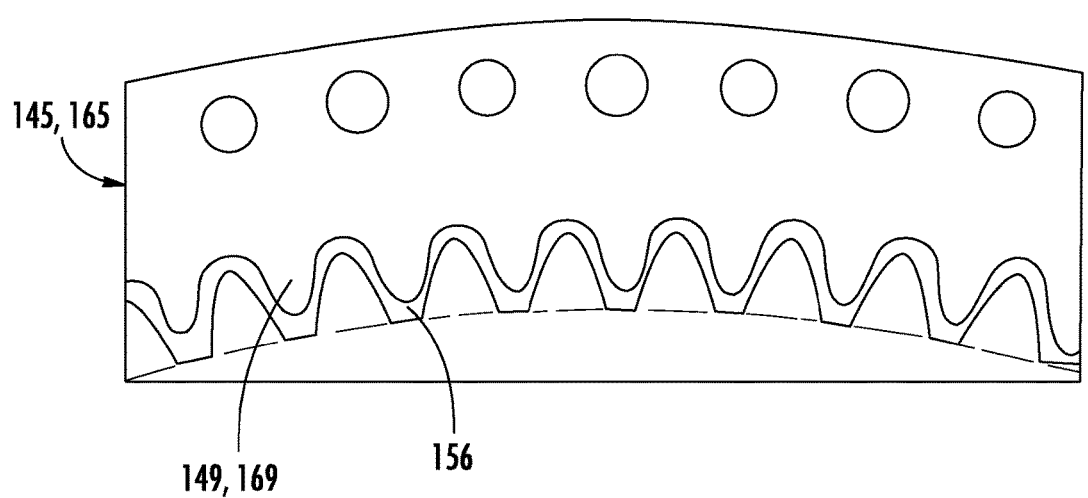
FIG. 11 illustrates a detailed view of the gear teeth of a ring gear of a gearbox of a wind turbine according to the present disclosure, particularly illustrating a coating material applied to the gear teeth via additive manufacturing.

In addition, as shown in FIG. 11, the first and second stage gear assemblies 160, 162 may include one or more coating materials 156 applied to the plurality of gear teeth 149, 169 of the ring gear(s) 145, 165 so as to increase a hardness of the gear teeth 149, 169. More specifically, in one embodiment, the coating material(s) 156 may include boron nitride, aluminum oxide, silicon carbide, tungsten carbide, and/or combinations thereof, as well as any other material for providing a desired hardness to the gear teeth 149, 169.

Figure 12:
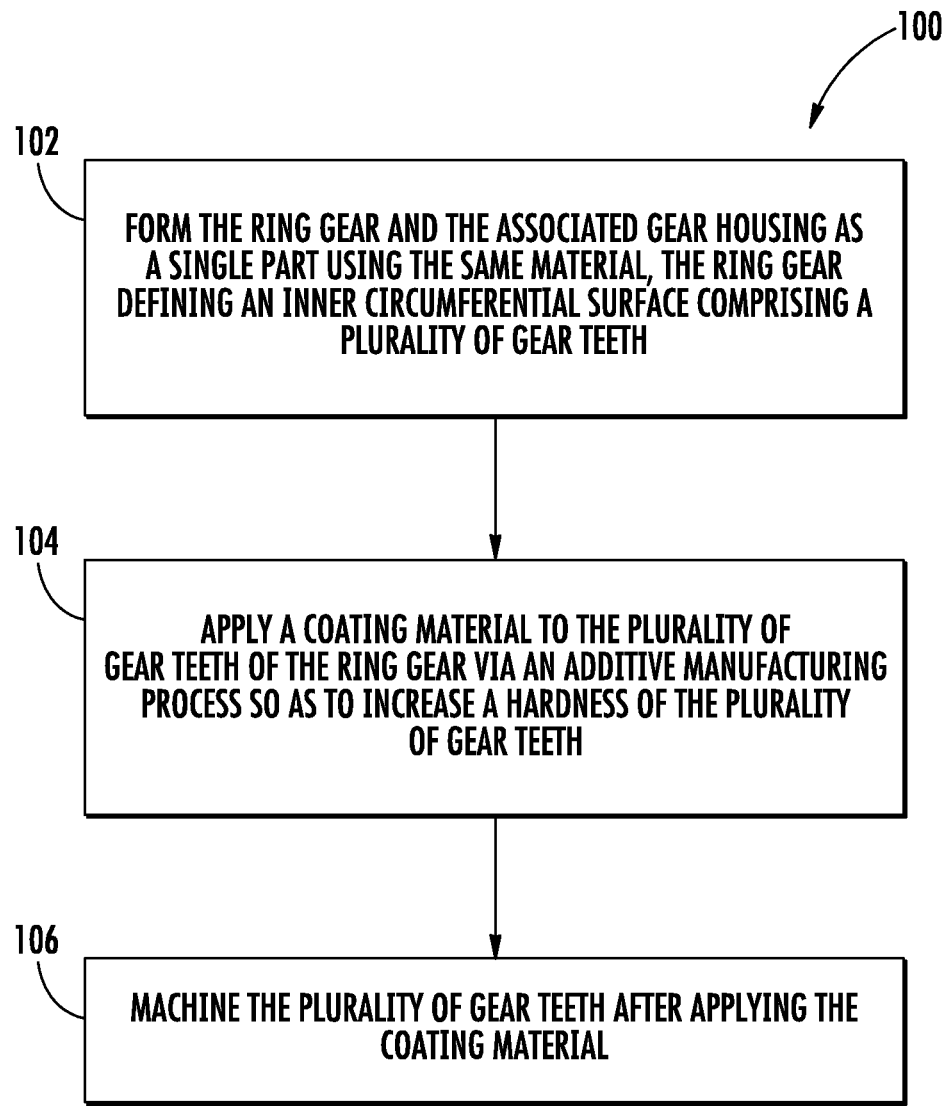
FIG. 12 illustrates a flow diagram of one embodiment of a method for manufacturing a ring gear and a gear housing of a gearbox of a wind turbine according to the present disclosure.

Referring now to FIG. 12, a flow diagram of one embodiment of a method 100 for manufacturing the ring gear(s) 145, 165 and associated housing(s) 150, 164 of the gearbox of the wind turbine is illustrated. As shown at 102, the method 100 includes forming the ring gear(s) 145, 165 and the associated gear housing(s) 150, 164 as a single part using the same material. In several embodiments, the associated gear housing(s) 150, 164 may include any suitable housing or casing of the gearbox, including but not limited to first and/or second stage gear housings as well as the torque support 50 thereof.

More specifically, in one embodiment, the ring gear(s) 145, 165 may be formed integrally with the housing(s) 150, 164, respectively, via casting both components into a single mold. In such embodiments, casting of the ring gear(s) 145, 165 and the housing(s) 150, 164 may include pouring a liquid material into a mold of the ring gear(s) 145, 165 and the housing(s) 150, 164 and allowing the liquid material to solidify in the mold so as to form the ring gear(s) 145, 165 and the housing(s) 150, 164 as the single part. For example, in certain embodiments, the integral ring gear/gear housing structure may be formed from steel, cast steel, iron, ductile iron, or any other suitable material. In one embodiment, direct surface hardening methods can be implemented, such as induction hardening, to increase the surface hardness of the casted gear teeth. In such embodiments, casting is not necessary if the required surface hardness can be achieved by such surface hardening methods.

As shown at 104, the method 100 includes applying the coating material 156 to the gear teeth 149, 169 of the ring gear(s) 145, 165 via an additive manufacturing process so as to increase a hardness of the gear teeth 149, 169. As used herein, an additive manufacturing process generally refers to processes used to deposit materials under computer control to create a shape. Thus, the additive manufacturing processes described herein may include cold spraying, thermal spray, laser cladding, binder jetting, material jetting, directed energy deposition, powder bed fusion, or any other suitable additive manufacturing process. Accordingly, in one embodiment, the coating material 156 may be applied to the gear teeth 149, 169 via cold spraying.

In certain embodiments, when the ring gear(s) 145, 165 and housing(s) 150, 164 is formed, the final part may have a near net shape (i.e. the part is very close to the final (net) shape, reducing the need for surface finishing). As such, the near net shape reduces required finishing, such as machining or grinding. As shown at 106, the method 100 may also include minimally machining the gear teeth 149, 169 after applying the coating material 156. More specifically, in such embodiments, the method 100 may include hobbing and/or grinding the gear teeth 149, 169, if needed, after applying the coating material 156. Thus, the additional machining is configured to achieve the micro-geometry of the gears.

Figure 13:
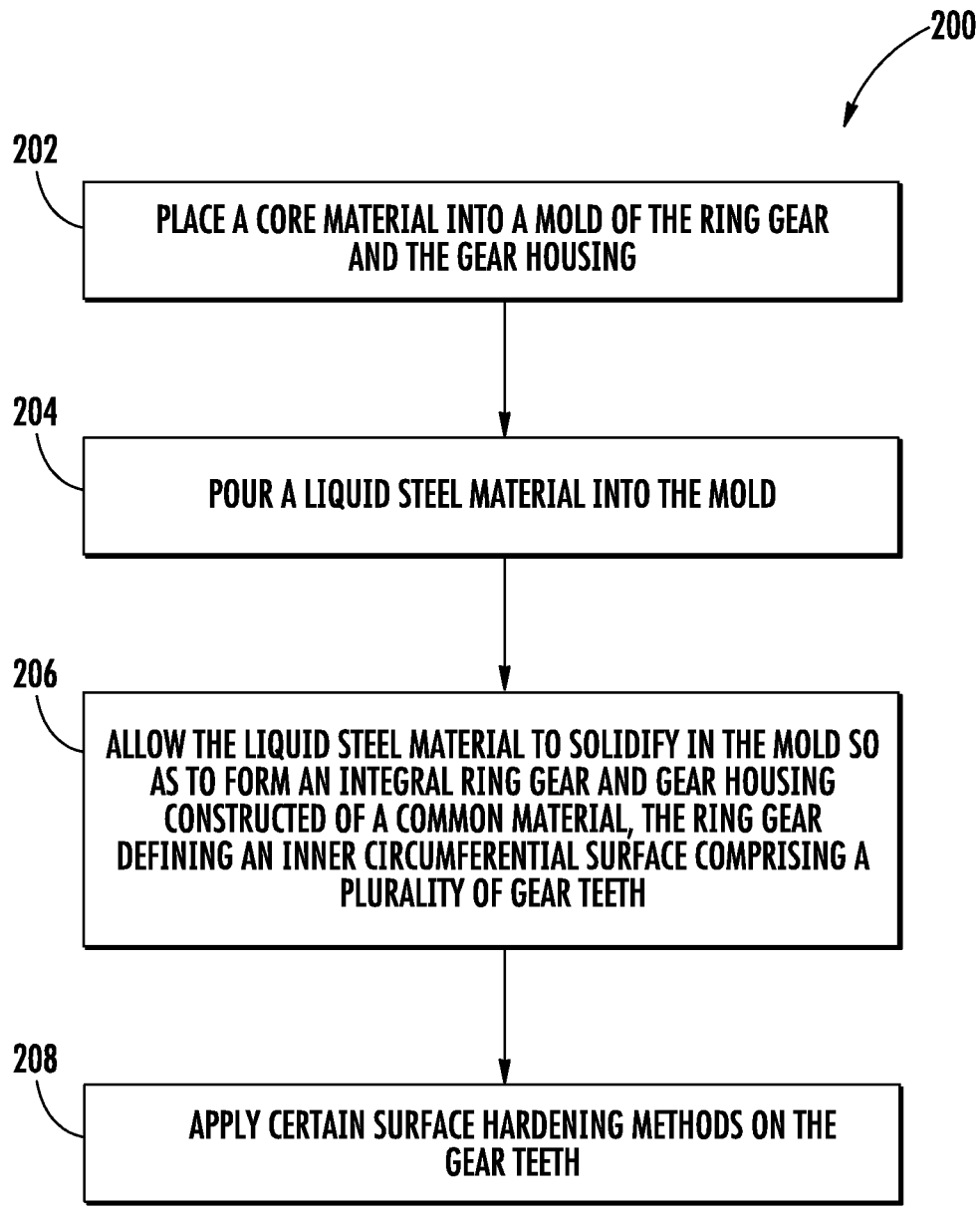
FIG. 13 illustrates a flow diagram of another embodiment of a method for manufacturing a ring gear and a gear housing of a gearbox of a wind turbine according to the present disclosure.

Referring now to FIG. 13, a flow diagram of another embodiment of a method 200 for manufacturing the ring gear(s) 145, 165 and associated housing(s) 150, 164 of the gearbox of the wind turbine is illustrated. More specifically, FIG. 13 illustrates a method 200 in which the ring gear(s) 145, 165 and associated housing(s) 150, 164 are integral casted steel components. As such, the coating material 156 may not be required. More specifically, as shown at 202, the method 200 includes placing a core material into a mold of the ring gear(s) 145, 165 and associated housing(s) 150, 164. As shown at 204, the method 200 includes pouring a liquid steel material into the mold of the ring gear(s) 145, 165 and associated housing(s) 150, 164 around the core material. It should also be understood that the core material is optional and may be omitted in certain embodiments.

As shown at 206, the method 200 includes allowing the liquid steel material to solidify in the mold so as to form the integral ring gear 145, 165 and housing(s) 150, 164 structure constructed of a common material. In another embodiment, as shown at 208, the method 200 may optionally include applying certain surface hardening methods, e.g. induction hardening, on the gear teeth 149, 169 of the ring gear 145, 165 so as to increase a hardness thereof. In one embodiment, direct surface heat treatment methods can be implemented, e.g. induction hardening, to increase the surface hardness of the casted gear teeth.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a ring gear and associated housing of a gearbox of a wind turbine, the method comprising:
    forming the ring gear and the associated gear housing as a single part using the same material, the ring gear defining an inner circumferential surface comprising a plurality of gear teeth; and,
    applying a coating material to the plurality of gear teeth of the ring gear via an additive manufacturing process so as to increase a hardness of the plurality of gear teeth.

2. The method of claim 1, wherein the additive manufacturing process comprises at least one of cold spraying, thermal spray, laser cladding, binder jetting, material jetting, directed energy deposition, or powder bed fusion.

3. The method of claim 1, wherein the coating material comprises at least one of boron nitride, aluminum oxide, silicon carbide, or tungsten carbide.

4. The method of claim 1, wherein forming the ring gear and the associated gear housing as the single part further comprises casting the ring gear and the gear housing as the single part.

5. The method of claim 4, wherein casting the ring gear and the gear housing as the single part further comprises:
    pouring a liquid material into a mold of the ring gear and the gear housing; and,
    allowing the liquid material to solidify in the mold so as to form the ring gear and the gear housing as the single part.

6. The method of claim 1, further comprising forming the ring gear and the gear housing from at least one of steel, cast steel, iron, or ductile iron.

7. The method of claim 1, wherein the associated gear housing comprises at least one of a first stage gear housing, a second stage gear housing, or a torque support of the gearbox.

8. The method of claim 1, further comprising machining the plurality of gear teeth after applying the coating material.

9. The method of claim 8, wherein machining the plurality of gear teeth further comprises at least one of hobbing or grinding the plurality of gear teeth after applying the coating material.

* * * * *